United States Patent Office 3,420,816
Patented Jan. 7, 1969

3,420,816
DERIVATIVES OF VERNAMYCIN B
Miklos Bodanszky, Princeton, N.J., assignor, by mesne assignments, to E. R. Squibb & Sons, Inc., New York, N.Y., a corporation of Delaware
No Drawing. Filed Mar. 15, 1965, Ser. No. 439,989
U.S. Cl. 260—239.3    3 Claims
Int. Cl. C07d 87/54

ABSTRACT OF THE DISCLOSURE

This invention relates to new compounds having the following structural formula

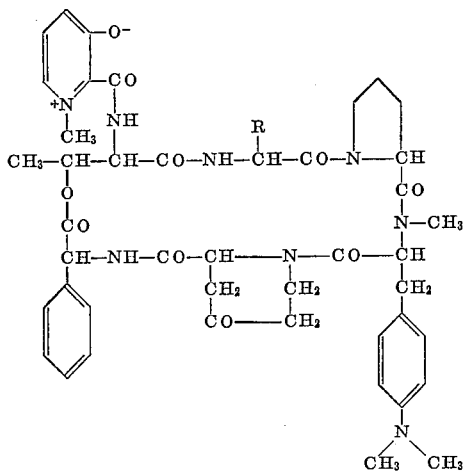

substances which are useful as antimicrobial agents or to enhance the antimicrobial effect of vernamycin A.

---

Vernamycin B, an antibiotic which is the subject of U.S. Patent No. 2,990,325, issued June 27, 1961, like some other antibiotic substances has been found to consist of closely related constituents rather than a single entity. This invention relates to derivatives of constituents of vernamycin B.

When vernamycin B, prepared as described in U.S. Patent No. 2,990,325 is subjected to countercurrent distribution in a system of toluene-methanol-water (4:3:1), one compound, denominated vernamycin $B_\alpha$, collects in the fraction characterized by a peak representing a distribution coefficient $(k)=2.2$. Another compound, denominated vernamycin $B_\gamma$, collects in the fraction with a $k$ value=1.4. The varnamycin $B_\alpha$ or vernamycin $B_\gamma$ may be isolated from the fraction by evaporating the solvent and crystallizing from an organic solvent, e.g., methanol or toluene.

Treatment of bernamycin $B_\alpha$ of vernamycin $B_\gamma$ with diazomethane in an inert organic solvent such as an alcohol, e.g., methanol, or an ether, e.g., ethyl ether, or mixtures thereof of such compounds, yields a mixture of two derivatives in which the pyridine ring is selectively methylated. These products have the structural formulas (Formula II being in the nature of a betaine):

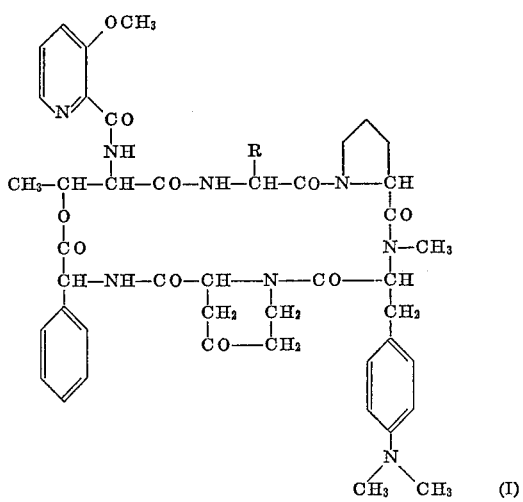

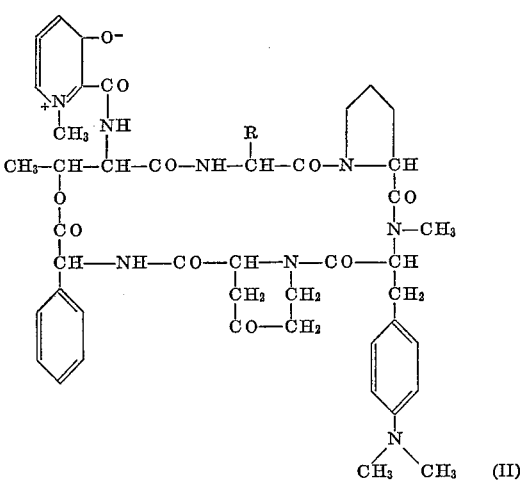

R represents methyl (as in $B_\gamma$) or ethyl (as in $B_\alpha$).
Treatment of vernamycin $B_\alpha$ or $B_\gamma$ with an alkyl halide, alkyl sulfate, phenyl lower alkyl halide or sulfate, etc. in an inert organic solvent such as those referred to previously yields another selectively alkylated derivative having the formula:

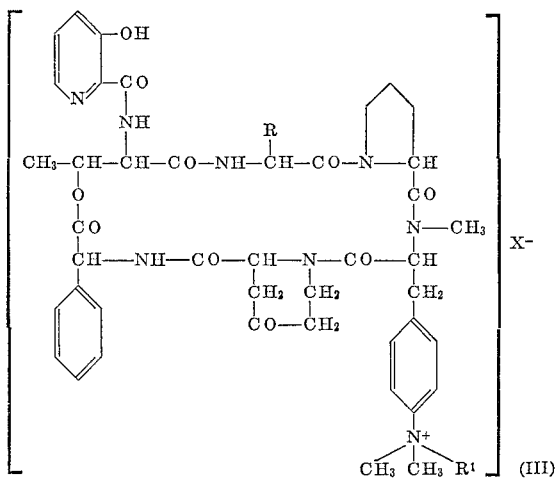

R is similarly methyl or ethyl and $R^1$ is lower alkyl, e.g. methyl, ethyl, propyl or the like, phenyl lower alkyl, e.g., benzyl, phenethyl and the like, and X is a halide such as chloride, bromide or iodide, sulfate or other anion of an acid, particularly inorganic acids and especially mineral acids.

The compounds of this invention are useful as antimicrobial agents particularly in enhancing the antimicrobial activity of vernamycin A, e.g., against organisms such as Staphylococcus, e.g., *Staphylococcus aureus* and Streptococcus, e.g., *Streptococcus lactis* when administered together with vernamycin A. The addition of the compounds of this invention to subinhibitory concentrations of vernamycin A potentiates the latter so that an effective antimicrobial composition is obtained. The composition may be administered orally or parenterally in the same manner as vernamycin A.

Compound III exhibits cytotoxic activity in inhibiting the growth of the KB line of epidermoid carcinoma.

Example 1

Vernamycin B (2 g.) is dissolved in both layers (100–100 ml.) of the solvent system toluene-methanol water, the solutions are placed in the first 10 tubes of an automatic counter-current distribution apparatus and distributed in the same system through 100 transfers. Tubes corresponding to peaks with $k$ values=2.2 ($\alpha$), 1.4 ($\gamma$), 0.8 ($\beta$) and 0.5 ($\delta$) are removed from the apparatus and the individual components are isolated by removal of the solvents in vacuo, followed by crystallization of the residues, e.g., from methanol or toluene. The individual components are best characterized by quantitative amino acid analysis or by their nuclear-magnetic resonance spectra.

Example 2

A solution of vernamycin $B_a$ (2 g.) in methanol (100 ml.) is treated with an ethereal solution of diazomethane (generated from 3.6 g. of nitroso-N-methylnitroguanidine). After about thirty minutes at room temperature, a few drops of acetic acid are added to destroy the excess diazomethane. The solvents are removed in vacuo, and the residue is triturated with methanol until it turns into a crystalline mass. The latter is suspended in ether, filtered, washed with ether and dried at room temperature. The product is separated into its components by counter-current distribution in the system of chloroform-toluene-methanol-water (5:5:8:2). From tubes corresponding to a peak with a distribution coefficient ($k$) of ca. 0.38, the compound of Formula II, wherein R is ethyl, above is obtained by evaporation of the solvents in vacuo. The compound of Formula I, wherein R is ethyl, is obtained in tubes with $k=0.26$.

The compound of Formula II melts with decomposition at 260–270°. On thin layer chromatography (silica gel) in a system of chloroform-methanol (100:15), it travels with an $R_f$ value of about 0.5. The spot is fluorescent under ultraviolet light. The NMR spectrum of the product in deuterioacetic acid ($CD_3COOD$) shows in addition to the peaks which are present in the spectrum of vernamycin A also a three proton peak at $\tau=5.52$. No O-methyl group is found by Zeisel determination, but under more drastic conditions four methyl groups (N-methyl groups) are released. No acidic group is found by titration.

The compound of Formula I has an $R_f$ value of about 0.6 in the thin layer chromatographic system mentioned above. The spot is not fluorescent but it can be revealed by exposure to iodine vapors. The NMR spectrum (in $CD_3COOD$) shows a three proton peak at $\tau=6.02$. Analysis reveals one O-methyl and three N-methyl groups.

Example 3

To a solution of vernamycin $B_a$ (0.15 g.) in methanol (7 ml.) methyl iodide (3 ml.) is added. After three days at room temperature the solvent and the excess reagent are removed in vacuo. The residue is the product of Formula III wherein R is ethyl, $R^1$ is methyl and X is iodine. The material contains one atom of iodine (ionic) per mole, and analysis reveals the presence of four N-methyl groups. In the NMR spectrum (in $CD_3COOD$) instead of the characteristic six proton peak at $\tau=6.98$, corresponding to the protons of the dimethylamino group of the p-dimethylamino-N-methyl-L-phenyl-alanine moiety, a nine proton peak is found at $\tau=6.20$.

Example 4

By following the procedure of Example 2, but utilizing vernamycin $B_\gamma$ as the starting material, the compounds of Formula I and II wherein R is methyl are obtained.

Example 5

By following the procedure of Example 3, but utilizing vernamycin $B_\gamma$ as the starting material, the compound of Formula III wherein R is methyl, $R^1$ is methyl and X is iodine is obtained.

What is claimed is:
1. A compound of the formula

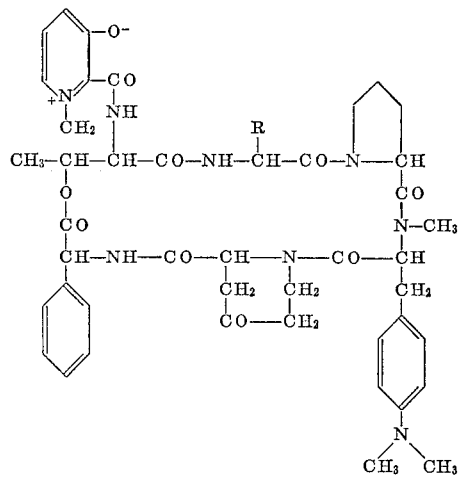

wherein R is a member of the group consisting of methyl and ethyl.
2. The compound of claim 1 wherein R is methyl.
3. The compound of claim 1 wherein R is ethyl.

(References on following page)

References Cited

UNITED STATES PATENTS 2,990,325 6/1961 Donovick et al. ____ 260—239.3
3,137,640 6/1961 Watanabe _____ 260—293.3

OTHER REFERENCES

Chemical Abstracts, vol. 62, cols. 7862–3 (1965).
Fieser et al.: "Advanced Organic Chemistry," pp. 306–7, 494–5 (Reinhold) (1961).

HENRY R. JILES, *Primary Examiner.*
R. T. BOND, *Assistant Examiner.*

U.S. Cl. X.R.

424—267